(12) United States Patent
Wei (10) Patent No.: US 10,082,703 B2
(45) Date of Patent: Sep. 25, 2018

(54) COMPOSITE SUBSTRATE AND METHODS FOR FABRICATING THE SAME, AND LIQUID CRYSTAL DISPLAY PANEL

(71) Applicants: Xiamen Tianma Micro-Electronics Co., Ltd., Xiamen (CN); Tianma Micro-Electronics Co., Ltd., Shenzhen (CN)

(72) Inventor: Sifan Wei, Shanghai (CN)

(73) Assignees: XIAMEN TIANMA MICRO-ELECTRONICS CO., LTD., Xiamen (CN); TIANMA MICRO-ELECTRONICS CO., LTD., Shenzhen (CN)

(*) Notice: Subject to any disclaimer, the term of this patent is extended or adjusted under 35 U.S.C. 154(b) by 227 days.

(21) Appl. No.: 14/861,999

(22) Filed: Sep. 22, 2015

(65) Prior Publication Data
US 2017/0003551 A1    Jan. 5, 2017

(30) Foreign Application Priority Data

Jun. 30, 2015    (CN) .......................... 2015 1 0373268

(51) Int. Cl.
G02F 1/1337        (2006.01)
G02F 1/1335        (2006.01)
(52) U.S. Cl.
CPC .. G02F 1/133711 (2013.01); G02F 1/133788 (2013.01); *G02F 2001/133548* (2013.01); *G02F 2202/36* (2013.01)
(58) Field of Classification Search
CPC ................ G02F 1/133723; G02F 1/133788
See application file for complete search history.

(56) References Cited

U.S. PATENT DOCUMENTS

2006/0154041 A1    7/2006  Hashimoto et al.
2009/0196981 A1*   8/2009  Liu ........................ B82Y 30/00
                                                          427/113
(Continued)

FOREIGN PATENT DOCUMENTS

CN          1726421 A       1/2006
CN        101526696 A       9/2009
(Continued)

OTHER PUBLICATIONS

Chinese Application No. 201510373268.4, First Office Action dated Jun. 19, 2017.
(Continued)

*Primary Examiner* — Thanh-Nhan P Nguyen
(74) *Attorney, Agent, or Firm* — Alston & Bird LLP (57) ABSTRACT

Provided are a liquid crystal display panel, and a composite substrate and a method for fabricating the composite substrate. The composite substrate includes: a substrate, a carbon nanotube layer and a photoalignment matrix material. The carbon nanotube layer is adhered to a surface of the substrate with the photoalignment matrix material; the carbon nanotube layer includes multiple carbon nanotubes extending in a same direction. Multiple grooves arranged in parallel may be formed between carbon nanotubes since the extending direction of the carbon nanotube is the same, and the groove may be used for an initial alignment of liquid crystal molecules, hence the carbon nanotube layer may serve as an alignment layer. In addition, the carbon nanotube has a polarizing feature to serve as a polarizing layer. Therefore, the composite substrate may serve as both the alignment layer and the polarizing layer.

14 Claims, 6 Drawing Sheets

(56) References Cited

U.S. PATENT DOCUMENTS

2009/0225264 A1  9/2009 Fu et al.
2009/0225265 A1* 9/2009 Fu .................... G02F 1/1337
                                                349/128

FOREIGN PATENT DOCUMENTS

| CN | 102337004 A   | 2/2012  |
|----|---------------|---------|
| CN | 102654672 A   | 9/2012  |
| CN | 103235357 A   | 8/2013  |
| JP | 2009217265 A  | 9/2009  |
| KR | 10-1324398 B1 | 11/2013 |

OTHER PUBLICATIONS

Chinese Application No. 201510373268.4, Second Office Action dated Dec. 11, 2017.

* cited by examiner

COMPOSITE SUBSTRATE AND METHODS FOR FABRICATING THE SAME, AND LIQUID CRYSTAL DISPLAY PANEL

CROSS REFERENCE TO RELATED APPLICATIONS

The present application claims the priority to Chinese Patent Application No. 201510373268.4, titled "COMPOSITE SUBSTRATE AND METHODS FOR FABRICATING THE SAME, AND LIQUID CRYSTAL DISPLAY PANEL", filed on Jun. 30, 2015 with the State Intellectual Property Office of the People's Republic of China, the content of which is incorporated herein by reference in its entirety.

FIELD OF THE INVENTION

The present disclosure relates to the technical field of display devices, and in particular, to a liquid crystal display panel, and a composite substrate and a method for fabricating the composite substrate.

BACKGROUND OF THE INVENTION

At present, a liquid crystal display, as one of mainstream display devices, is widely applied in various electronic products and is a necessary tool in people's work and daily life. It has advantages such as ultrathin, displayable with a large-sized panel, a low power consumption, non-radiation and a high resolution.

Figure 1:
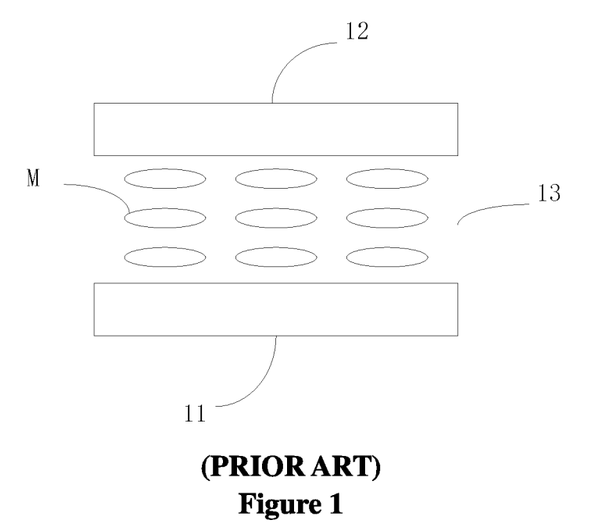
FIG. 1 is a schematic structural diagram of a conventional liquid crystal display.

FIG. 1 is a schematic structural diagram of a conventional liquid crystal display. The liquid crystal display includes: a Thin Film Transistor (TFT) array substrate 11 and a color filter substrate 12 arranged opposite to each other; and a liquid crystal layer 13 arranged between the TFT array substrate 11 and the color filter substrate 12.

In the conventional liquid crystal display, in order to ensure a normal image display, an alignment layer is arranged on a side of the TFT array substrate 11 close to the liquid crystal layer, so that a liquid crystal molecule M has an initial deflection angle. Moreover, a polarizer is arranged on a side of the TFT array substrate 11 far away from the liquid crystal layer, to selectively pass a linearly polarized light.

As can be seen, in the conventional TFT array substrate, two separate structures are necessary to serve as an alignment layer and a polarizer respectively, which results in a complex structure and a high fabrication cost.

BRIEF SUMMARY OF THE INVENTION

In order to address the above issues, a liquid crystal display panel, a composite substrate and a method for fabricating the composite substrate are provided according to embodiments of the present disclosure, so as to simplify a structure and a fabrication cost of a TFT array substrate.

In order to achieve the above object, the present disclosure provides the following technical solutions.

A composite substrate includes: a substrate, a carbon nanotube layer and a photoalignment matrix material, wherein the carbon nanotube layer is adhered to a surface of the substrate with the photoalignment matrix material; and the carbon nanotube layer includes multiple carbon nanotubes extending in a same direction.

A liquid crystal display panel is further provided according to the present disclosure. The liquid crystal display panel includes: a TFT array substrate and a color filter substrate arranged opposite to each other, and a liquid crystal layer arranged between the TFT array substrate and the color filter substrate; and the liquid crystal display panel further includes: a photoalignment matrix material and a carbon nanotube layer, wherein the carbon nanotube layer is adhered, with the photoalignment matrix material, to a surface of the TFT array substrate and/or a surface of the color filter substrate which are close to the liquid crystal layer; and the carbon nanotube layer includes multiple carbon nanotubes extending in a same direction.

A method for fabricating a composite substrate is further provided according to the present disclosure. The method includes:

preparing a substrate;

coating the substrate with a photoalignment matrix material;

laying a carbon nanotube layer on a surface of the photoalignment matrix material, the carbon nanotube layer including multiple carbon nanotubes extending in a same direction; and solidifying the photoalignment matrix material to adhere the carbon nanotube layer to a surface of the substrate.

It can be seen from the above description that, the composite substrate according to the present disclosure includes: the substrate, the carbon nanotube layer and the photoalignment matrix material. The carbon nanotube layer is adhered to the surface of the substrate with the photoalignment matrix material. The carbon nanotube layer includes multiple carbon nanotubes extending in a same direction. Since the multiple carbon nanotubes of the carbon nanotube layer extend in the same direction, multiple grooves arranged in parallel may be formed between the carbon nanotubes arranged in parallel. The groove may be used for an initial alignment of the liquid crystal molecule, hence the carbon nanotube layer may serve as an alignment layer. In addition, the carbon nanotube has a polarizing feature, to transmit a light of which a polarization direction is perpendicular to the extending direction of the carbon nanotube and absorb a light of which a polarization direction is parallel to the extending direction of the carbon nanotube, hence the carbon nanotube layer may also serve as a polarizing layer. Therefore, the composite substrate may serve as both an alignment layer and a polarizing layer. Furthermore, the polarizing performance may be improved by adhering the carbon nanotube layer to a transparent substrate with the photoalignment matrix material without an additional adhesive. Hence, the composite substrate serving as a TFT array substrate has advantages of a simple structure and a low cost.

The liquid crystal display panel according to the present disclosure has a simple structure and a low fabrication cost since the composite substrate serves as the TFT array substrate and/or the color filter substrate.

The composite substrate may be prepared with a simple procedure and a low cost, with the method for fabricating the composite substrate according to the present disclosure.

BRIEF DESCRIPTION OF THE DRAWINGS

The drawings to be used in the description of embodiments of the disclosure or the conventional technology are described briefly as follows, so that the technical solutions according to the embodiments of the present disclosure or according to the conventional technology may become clearer. It is apparent that the drawings in the following description only illustrate some embodiments of the present disclosure. For those skilled in the art, other drawings may be obtained according to these drawings without any creative work.

DETAILED DESCRIPTION OF THE INVENTION

Technical solutions according to embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

In a conventional liquid crystal display, each of a TFT array substrate and a color filter substrate has an alignment layer and a polarizer. The alignment layer and the polarizer are separately prepared for both the TFT array substrate and the color filter substrate. In a preparation of an alignment layer, an alignment layer is rubbed to be aligned after being formed. In a fabrication of a polarizer, a multi-layer structure of the polarizer is prepared, which results in a more complex procedure and a higher fabrication cost. The polarizer generally includes a polarizing layer, a TAC (poly cellulose triacetate) layer, an adhesive layer, a release film, a protective film and a reflecting film.

It is found by the inventor after research that, both of the alignment layer and the polarizer may be achieved with the carbon nanotube layer, thereby addressing the issues of a complex structure and a high fabrication cost since the alignment layer and the polarizer are prepared separately in the conventional TFT array substrate and the conventional color filter substrate.

Figure 2:
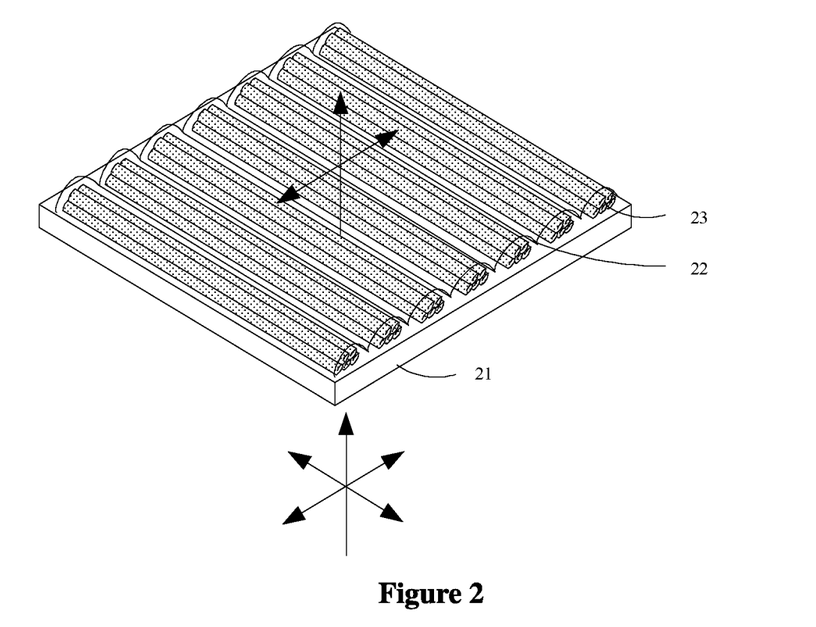
FIG. 2 is a schematic structural diagram of a composite substrate according to an embodiment of the present disclosure.
Figure 3:
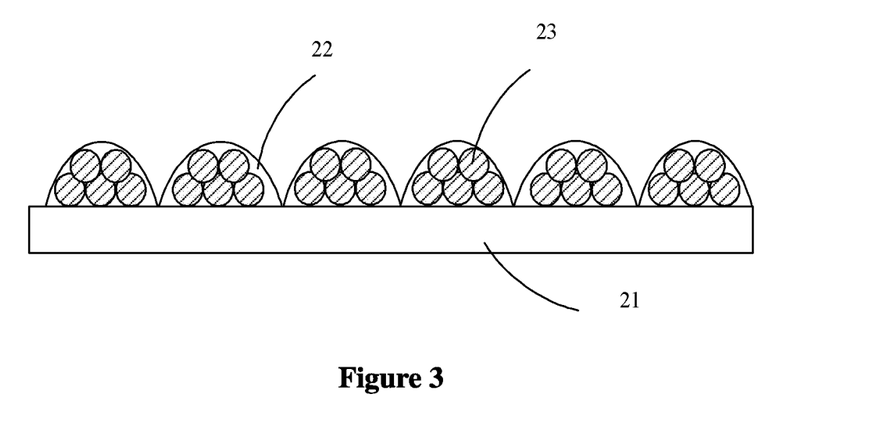
FIG. 3 is a sectional diagram of the composite substrate shown in FIG. 2 in a direction perpendicular to an extending direction of carbon nanotube

Based on the above research, a composite substrate is provided according to an embodiment of the present disclosure, referring to FIG. 2 and FIG. 3. FIG. 2 is a schematic structural diagram of a composite substrate according to an embodiment of the present disclosure, and FIG. 3 is a sectional diagram of the composite substrate shown in FIG. 2 in a direction perpendicular to the extending direction of carbon nanotube.

The composite substrate includes a substrate 21, a carbon nanotube layer 23 arranged on a surface of the substrate 21, and photoalignment matrix material 22. The carbon nanotube layer 23 is adhered to the surface of the substrate 21 with the photoalignment matrix material 22. The carbon nanotube layer 23 includes multiple carbon nanotubes extending in a same direction.

The substrate 21 mainly serves as a support, and may be made of a flexible or hard transparent material, such as glass, quartz, diamond or plastic. In an embodiment, the substrate 21 may be a glass plate. Optionally, the substrate 21 may be a TFT array substrate, a color filter substrate or other structures of a liquid crystal display panel.

The carbon nanotube layer 23 includes at least one layer of carbon nanotube film. The carbon nanotube film may be a self-supported film structure directly pulled from a carbon nanotube array. The term "self-supported film structure" means that the carbon nanotube film can be hanged to maintain its film state by supporting forces provided by only two opposite edges, without a large area supporter.

Figure 4:
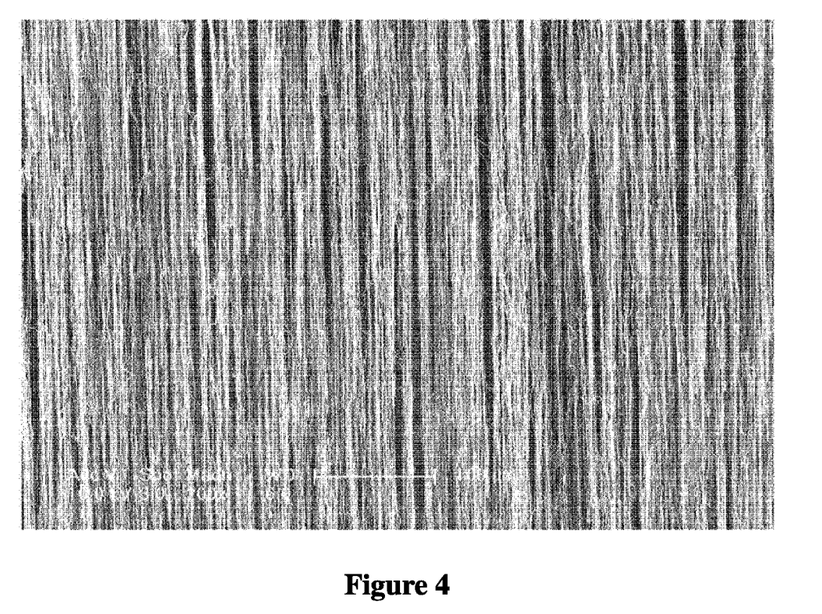
FIG. 4 is a schematic structural diagram of a carbon nanotube film under a microscope.

FIG. 4 is a schematic structural diagram of a carbon nanotube film under a microscope. The carbon nanotube film includes multiple carbon nanotubes preferably orientated in a same direction and arranged in parallel to a surface of the carbon nanotube film. Each carbon nanotube is end-to-end connected to a neighbor carbon nanotube in the extending direction of the carbon nanotube via van der Waals forces and is tightly connected to a neighbor carbon nanotube in a direction perpendicular to the extending direction of the carbon nanotube via van der Waals forces, to form a continuous self-supported film structure.

Since the carbon nanotubes of the carbon nanotube film extend in the same direction, multiple grooves extending in a same direction may be formed between the carbon nanotubes arranged in parallel. The groove may be used for an initial alignment of liquid crystal molecules. The carbon nanotube film has a thickness in a range between 0.5 nm and 100 μm, a width of the carbon nanotube film depends on a size of the carbon nanotube array from which the carbon nanotube film is pulled, and a length of the carbon nanotube film is not limited.

The carbon nanotube film has a good transparence and a light transmittance of the carbon nanotube film may be above 80%, since the carbon nanotube film has a small thickness. After the carbon nanotube film is thinned by a laser, the light transmittance of the carbon nanotube film may be above 90%. Therefore, the carbon nanotube film of the carbon nanotube layer according to an embodiment of the present disclosure is a laser-thinned carbon nanotube film, hence the carbon nanotube layer has a high light transmittance.

In addition, since the carbon nanotubes of the carbon nanotube film extend in the same direction, the carbon nanotube film is resistivity anisotropic, that is, the carbon nanotube film has a minimal resistance in the extending direction of the carbon nanotube and has a maximal electric resistance in a direction perpendicular to the extending direction of the carbon nanotube. The sheet resistance of the carbon nanotube film in a direction perpendicular to the extending direction of the carbon nanotube is more than ten times the sheet resistance of the carbon nanotube film in a direction parallel to the extending direction of the carbon nanotube.

Moreover, referring FIG. 2, the carbon nanotubes have a polarizing feature, to transmit a light of which a polarization direction is perpendicular to the extending direction of the carbon nanotube and absorb a light of which a polarization direction is parallel to the extending direction of the carbon nanotube. Therefore, the carbon nanotube film has a polarizing feature, hence the composite substrate has the polarizing feature and may serve as a polarizing layer.

The carbon nanotubes may be one or more of a single-walled carbon nanotube, a double-walled carbon nanotube and a multi-walled carbon nanotube. The carbon nanotube has a diameter in a range between 0.5 and 50 nm and has a length in a range between 50 nm and 5 mm. Preferably, the carbon nanotubes have a length in a range between 100 μm and 900 μm. The carbon nanotubes may be laid in parallel without a space to form a carbon nanotube layer 23 of a large area, or arranged in a stack manner to form a carbon nanotube layer 23 of a large thickness. As long as it is ensured that all carbon nanotubes of the carbon nanotube layer 23 extend in the same direction, any manner of arrangement may be used.

In a case that a layer of carbon nanotube film exists in the carbon nanotube layer 23, the carbon nanotube film has a high light transmittance, a low fabrication cost and the carbon nanotube film is laid simply. Therefore, in an embodiment, the carbon nanotube layer 23 is preferably configured to include only one layer of carbon nanotube film. It should be noted that, one layer of carbon nanotube film may include multiple carbon nanotubes stacked in thickness, and the number of carbon nanotubes stacked at different locations are not necessarily the same.

In the composite substrate according to an embodiment, the photoalignment matrix material has a good photoalignment performance, and can generate a predetermined photoalignment orientation with an irradiation of ultraviolet light. Hence, the photoalignment matrix material 22 has a predetermined photoalignment orientation, thereby improving an alignment performance of the carbon nanotube layer 23.

The alignment ability of the carbon nanotube layer 23 may be improved with the photoalignment matrix material 22, in a case that an included angle between the alignment orientation of the photoalignment matrix material 22 and the extending direction of the carbon nanotube is in a range from 0 degree to 90 degrees, inclusively. The photoalignment matrix material 22 may have a determined photoalignment orientation in a case that the photoalignment matrix material 22 is irradiated with a polarized ultraviolet light, and the photoalignment orientation may be determined by controlling a polarization direction of the polarized ultraviolet light and energy of the polarized ultraviolet light. Optionally, in an embodiment of the present disclosure, the included angle between the photoalignment orientation of the photoalignment matrix material 22 and the extending direction of the carbon nanotube is set to be 0 degrees, to enhance the alignment performance of the carbon nanotube layer 23 maximally.

The photoalignment matrix material 22 is in a liquid state initially, and the carbon nanotube layer 23 may be partially or completely covered with the photoalignment matrix material 22. In the embodiment referring to FIG. 2 and FIG. 3, the carbon nanotube layer 23 is completely covered with the photoalignment matrix material 22. After the photoalignment matrix material 22 is solidified, multiple grooves distributed uniformly may be formed on a surface of the photoalignment matrix material 22 due to grooves in the carbon nanotube layer.

The photoalignment matrix material 22 includes any one or more kinds of materials of cellulose triacetate, polyimide and polyamic acid. In an embodiment, the photoalignment matrix material 22 is the polyimide.

Referring to FIG. 2 and FIG. 3, the photoalignment matrix material 22 is in a liquid state initially, permeates into spaces between adjacent carbon nanotubes, and covers a surface of the carbon nanotube layer 23 far away from the substrate 21. Multiple grooves are formed on the surface of the photoalignment matrix material 22 far away from the substrate 21, and an extending direction of the groove is parallel to the extending direction of the carbon nanotube. In this case, after the photoalignment matrix material 22 is solidified, a microstructure of the surface of the photoalignment matrix material 22 may be the same as a microstructure of the carbon nanotube layer, and the photoalignment matrix material 22 may be cooperated with the carbon nanotube layer 23, thereby significantly improving the alignment performance of the carbon nanotube layer 23.

The composite substrate according to the embodiment of the present disclosure has advantages as follows. Since the carbon nanotube layer 23 has a regular microstructure and is modified with the photoalignment matrix material 22, the composite substrate may have a good alignment performance and may be adhered to a surface of an element with the photoalignment matrix material 22 without an additional adhesive. The carbon nanotube layer 23 has a good electrical conductivity, a good light transmittance and a good polarizing performance. Accordingly, the composite substrate also has the above-described performances, and may serve as an alignment layer, a polarizer or other structures such as a transparent electrode.

It can be seen from the above description that, the composite substrate according to an embodiment of the present disclosure has a polarizing feature and an alignment feature, and may serve as a polarizer and an alignment layer. In a case that the substrate of the composite substrate is a TFT array substrate, the TFT array substrate may serve as a polarizer and an alignment layer, hence the TFT array substrate has a simpler structure and lower fabrication cost compared with the conventional TFT array substrate for which the polarizer and the alignment layer are prepared separately.

In a case that the substrate of the composite substrate is a color filter substrate, the color filter substrate may serve as a polarizer and an alignment layer, and hence the color filter substrate has a simpler structure and a lower fabrication cost compared with a conventional color filter substrate for which a polarizer and an alignment layer are prepared separately. Since the alignment layer and the polarizer for the composite substrate are integrated into one structure, the thickness and fabrication cost of a liquid crystal display panel may be reduced in a case that the composite substrate is used for preparing the liquid crystal display panel.

A polarizing performance may be further improved by adhering the carbon nanotube layer to a transparent substrate with the photoalignment matrix material without an additional adhesive.

Based on the composite substrate according to the above-described embodiment, a liquid crystal display panel is further provided according to an embodiment of the present disclosure. The liquid crystal display panel includes: a TFT array substrate and a color filter substrate arranged opposite to each other; and a liquid crystal layer arranged between the TFT array substrate and the color filter substrate. The liquid crystal display panel further includes: a photoalignment matrix material and a carbon nanotube layer. The carbon nanotube layer is adhered, with the photoalignment matrix material, to a surface of the TFT array substrate and/or a surface of the color filter substrate which are close to the liquid crystal layer; and the carbon nanotube layer includes multiple carbon nanotubes extending in a same direction.

An alignment direction of the TFT array substrate is perpendicular to an alignment direction of the color filter substrate, and a light polarization direction of the TFT array substrate is perpendicular to a light polarization direction of the color filter substrate.

A structure of the TFT array substrate may be set to be the structure of the composite substrate according to the above-described embodiment, and a conventional color filter structure is applied to the color filter substrate. That is, the carbon nanotube layer and the photoalignment matrix material are arranged on only the surface of the TFT array substrate close to the liquid crystal layer. A conventional polarizer is prepared on a surface of the color filter substrate far away from the liquid crystal layer and a conventional alignment layer is prepared on the surface of the color filter substrate close to the liquid crystal layer. In this case, the structure of the liquid crystal display panel is shown in FIG. 5.

Figure 5:
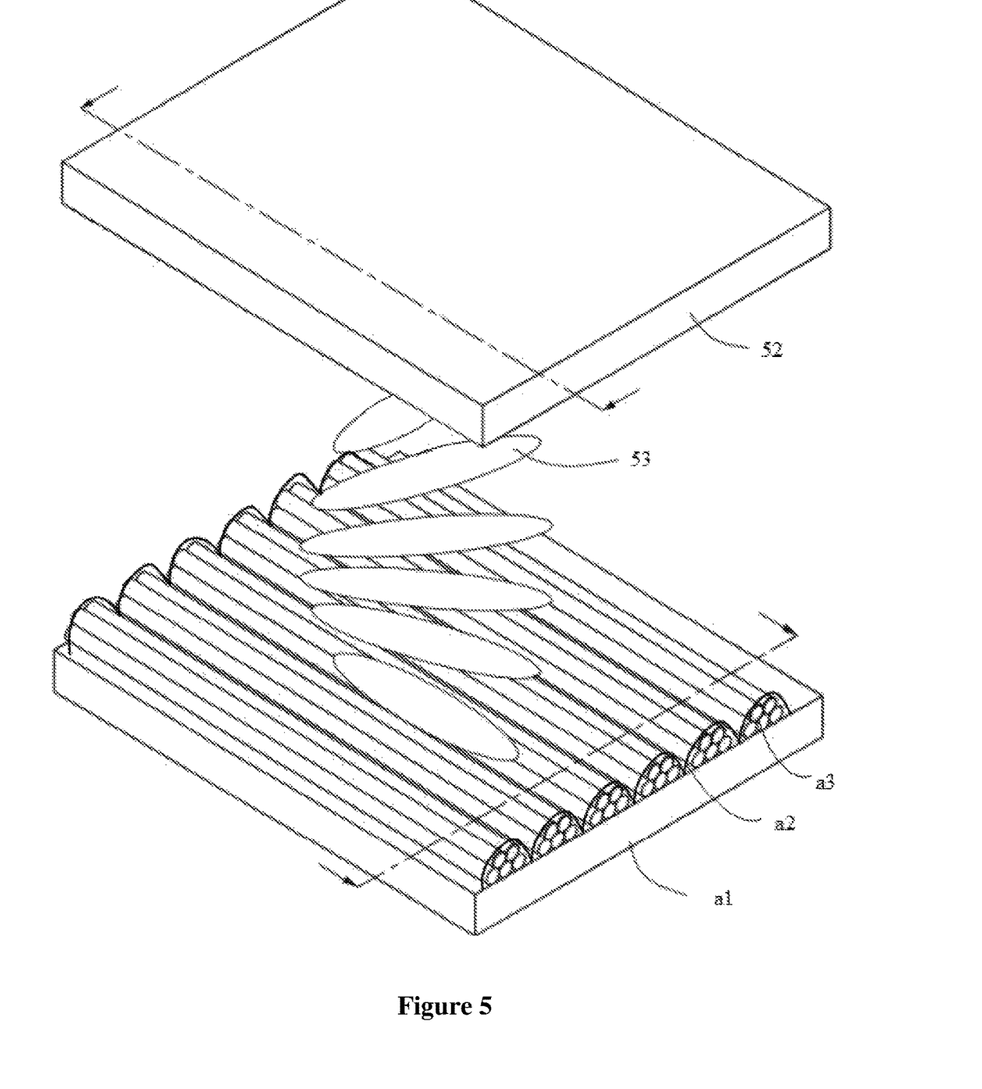
FIG. 5 is a schematic structural diagram of a liquid crystal display panel according to an embodiment of the present disclosure.

FIG. 5 is a schematic structural diagram of a liquid crystal display panel according to an embodiment of the present disclosure. The liquid crystal display panel includes: a TFT array substrate a1 and a color filter substrate 52 arranged opposite to each other; and a liquid crystal layer 53 arranged between the TFT array substrate a1 and the color filter substrate 52.

In the embodiment referring to FIG. 5, the color filter substrate 52 may have a structure of a conventional color filter substrate. A photoalignment matrix material a2 and a carbon nanotube layer a3 are arranged on a surface of the TFT array substrate a1 close to the liquid crystal layer 53.

In the liquid crystal display panel shown in FIG. 5, the alignment layer and polarizer on the surface of the TFT array substrate a1 may be replaced by the carbon nanotube layer a3 and the photoalignment matrix material a2, thereby simplifying the structure of the TFT array substrate a1, which leads to a simple fabrication procedure and a low cost. An Indium Tin Oxide (ITO) layer is formed to serve as a common electrode layer in a conventional TFT array substrate. In an embodiment of the present disclosure, since the carbon nanotube layer a3 has a good electrical conductivity in a direction parallel to the extending direction of the carbon nanotube, a common voltage may be input to the carbon nanotube layer a3 of the TFT array substrate a1, and the carbon nanotube layer a3 of the TFT array substrate a1 may serve as the common electrode layer. In this case, the structure of the TFT array substrate is simplified and the fabrication cost of the TFT array substrate is reduced since it is unnecessary to separately prepare a common electrode layer on the TFT array substrate.

In the liquid crystal display panel according to an embodiment of the present disclosure, the structure of the TFT array substrate may also be set to be a structure of a conventional TFT array substrate and the composite substrate according to the above-described embodiments may serve as the color filter substrate. That is, the carbon nanotube layer and the photoalignment matrix material are arranged on only the surface of the color filter substrate close to the liquid crystal layer, and the structure of the TFT array substrate is the structure of the conventional TFT array substrate. A polarizer is arranged on a surface of the TFT array substrate far away from the liquid crystal layer and an alignment layer is arranged on the surface of the TFT array substrate close to the liquid crystal layer. In this case, the structure of the liquid crystal display panel is shown in FIG. 6.

Figure 6:
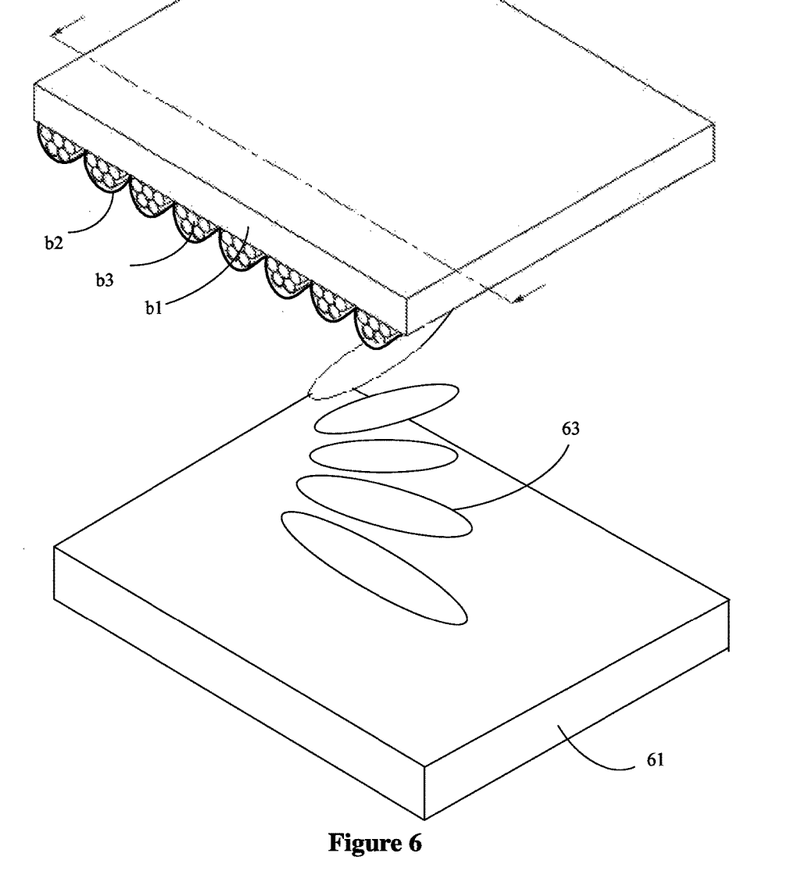
FIG. 6 is a schematic structural diagram of a liquid crystal display panel according to an embodiment of the present disclosure.

FIG. 6 is a schematic structural diagram of a liquid crystal display panel according to an embodiment of the present disclosure. The liquid crystal display panel includes: a TFT array substrate 61 and a color filter substrate b1 arranged opposite to each other; and a liquid crystal layer 63 arranged between the TFT array substrate 61 and the color filter substrate b1.

In the embodiment referring to FIG. 6, a structure of the TFT array substrate 61 may be a structure of a conventional TFT array substrate. A photoalignment matrix material b2 and a carbon nanotube layer b3 are arranged on a surface of the color filter substrate b1 close to the liquid crystal layer 63.

In the liquid crystal display panel shown in FIG. 6, the alignment layer and the polarizer on the surface of the color filter substrate b1 may be replaced by the carbon nanotube layer b3 and the photoalignment matrix material b2, thereby simplifying the structure of the color filter substrate, which leads to a simple fabrication procedure and a low cost. An ITO layer is formed to serve as a shielding electrode layer in a conventional color filter substrate. In an embodiment of the present disclosure, since the carbon nanotube layer b3 has a good electrical conductivity in a direction parallel to the extending direction of the carbon nanotube, the carbon nanotube layer b3 on the surface of the color filter substrate b1 may be grounded and may serve as a shielding electrode layer. Furthermore, the carbon nanotube layer b3 on the surface of the color filter substrate b1 may also be provided with an electrode connected to a common voltage, to serve as a common electrode layer. In this case, the structure of the color filter structure is further simplified and the fabrication cost of the color filter substrate is reduced since it is unnecessary to separately prepare the shielding electrode layer on the color filter substrate.

A carbon nanotube layer and a photoalignment matrix material may be arranged on a surface of the TFT array substrate and a surface of the color filter substrate. In this case, the carbon nanotube layer of the liquid crystal display panel includes a first carbon nanotube layer arranged on the surface of the TFT array substrate and a second carbon nanotube layer arranged on the surface of the color filter substrate. The photoalignment matrix material includes a first photoalignment matrix material layer arranged on the surface of the TFT array substrate and a second photoalignment matrix material layer arranged on the surface of the color filter substrate. The structure of the liquid crystal display panel is shown in FIG. 7.

Figure 7:
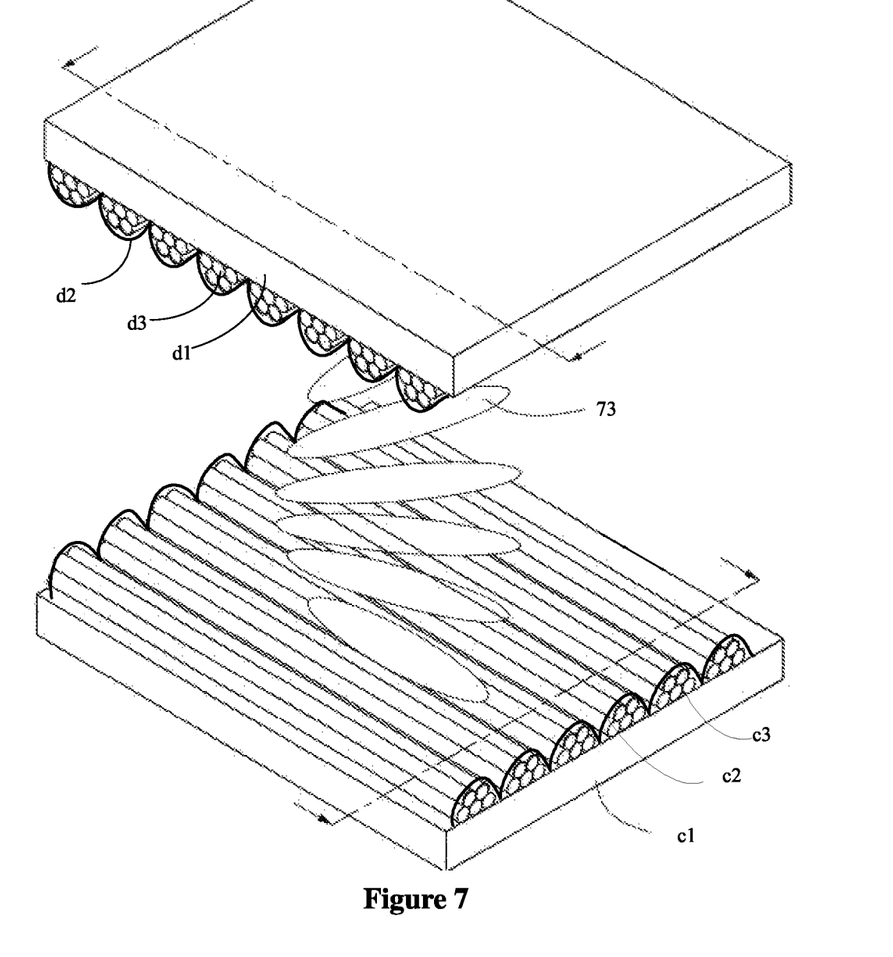
FIG. 7 is a schematic structural diagram of a liquid crystal display panel according to an embodiment of the present disclosure.

FIG. 7 is a schematic structural diagram of a liquid crystal display panel according to an embodiment of the present disclosure. The liquid crystal display panel includes: a TFT array substrate c1 and a color filter substrate d1 arranged opposite to each other; and a liquid crystal layer 73 arranged between the TFT array substrate c1 and the color filter substrate d1.

In the embodiment referring to FIG. 7, a first photoalignment matrix material layer c2 and a first carbon nanotube layer c3 are arranged on a surface of the TFT array substrate c1 close to the liquid crystal layer 73. A second photoalignment matrix material layer d2 and a second carbon nanotube layer d3 are arranged on a surface of the color filter substrate d1 close to the liquid crystal layer 73. An extending direction of the carbon nanotube of the TFT array substrate c1 is perpendicular to an extending direction of the carbon nanotube of the color filter substrate d1, so that an alignment direction of the TFT array substrate c1 is perpendicular to an alignment direction of the color filter substrate d1, and a light polarization direction of the TFT array substrate c1 is perpendicular to a light polarization direction of the color filter substrate d1.

In the liquid crystal display panel as shown in FIG. 7, as compared with the conventional liquid crystal display panel, the alignment layer and the polarizer on the surface of the TFT array substrate c1 may be replaced by the first carbon nanotube layer c3 and the first photoalignment matrix material layer c2, and the alignment layer and the polarizer on the surface of the color filter substrate d1 may be replaced by the second carbon nanotube layer d3 and the second photoalignment matrix material layer d2, thereby simplifying structures of the TFT array substrate c1 and the color filter substrate d1, which leads to a simple fabrication procedures and a low cost. For a conventional TFT array substrate, an ITO layer is formed to serve as a common electrode layer. In FIG. 7, since the carbon nanotube layer has a good electrical conductivity in a direction parallel to the extending direction of the carbon nanotube, a common voltage may be input to the first carbon nanotube layer c3 of the TFT array substrate c1, and the first carbon nanotube layer c3 of the TFT array substrate c1 may serve as a common electrode layer. In this case, it is unnecessary to separately prepare the common electrode layer on the TFT array substrate, thereby further simplifying the structure of the TFT array substrate and reducing the fabrication cost of the TFT array substrate. For a conventional color filter substrate, an ITO layer is formed to serve as a shielding electrode layer. In FIG. 7, since the carbon nanotube layer has a good electrical conductivity in a direction parallel to the extending direction of the carbon nanotube, the second carbon nanotube layer d3 of the color filter substrate d1 may be grounded and may serve as a shielding electrode layer. In this case, it is unnecessary to separately prepare the shielding electrode layer on the color filter substrate, thereby further simplifying the structure of the color filter substrate and reducing the fabrication cost of the color filter substrate.

In an embodiment of the present disclosure, in a case that the carbon nanotube layer of the composite substrate serves as a shielding electrode layer or a common electrode layer, special routings are arranged to ground the carbon nanotube layer or input the common voltage to the carbon nanotube layer.

Figure 8:
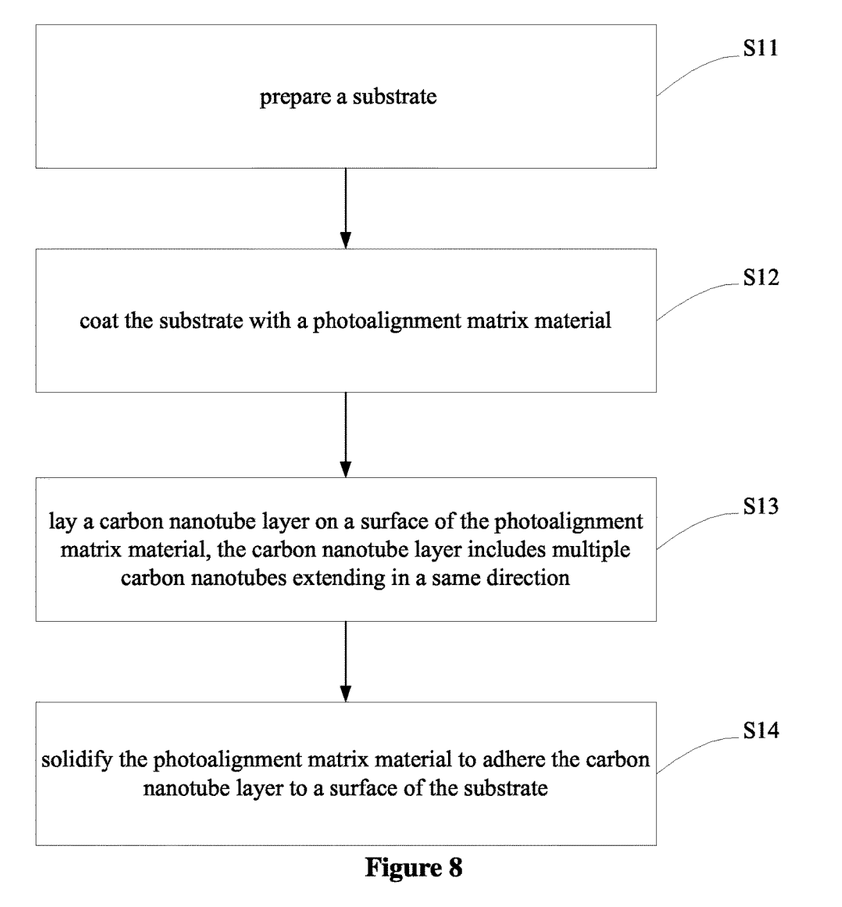
FIG. 8 is a flowchart of a method for fabricating a composite substrate according to an embodiment of the present disclosure.

A method for fabricating the composite substrate according to the above-described embodiments is further provided according to an embodiment of the present disclosure. FIG. 8 is a flowchart of a method for fabricating a composite substrate according to an embodiment of the present disclosure. The fabrication method includes steps S11 to S14.

In step S11, a substrate is prepared.

The substrate mainly serves as a supporter and may be made of a flexible or hard transparent material, such as glass, quartz, diamond and plastic. In the embodiment, the substrate is a glass plate. It is to be understood that, the substrate may also be a TFT array substrate, a color filter substrate or other structures of a liquid crystal display device.

In step S12, the substrate is coated with a photoalignment matrix material.

The photoalignment matrix material includes one or more of cellulose triacetate, polyimide and polyamic acid. The photoalignment matrix material is in a liquid state initially and the photoalignment matrix material, after being irradiated by light, aligned and solidified, may be used for adhering and fixing the carbon nanotube layer.

A surface of the substrate may be coated uniformly with a solution of the photoalignment matrix material in a whirl coating or spin-coating way. A thickness of the coating may be selected as needed. Preferably, the thickness of the coating is in a range between 100 nm and 100 μm.

In step S13, a carbon nanotube layer is laid on a surface of the photoalignment matrix material, and the carbon nanotube layer includes multiple carbon nanotubes extending in a same direction.

The carbon nanotube layer is completely or partially immersed in the coating. If the carbon nanotube layer serves as a common electrode layer or a shielding electrode layer, routings need to be arranged for the carbon nanotube layer in the step.

The step may further include a step of pre-baking the photoalignment matrix material in the liquid state, to remove an excess solvent in the prepolymer of photoalignment matrix material to facilitate the subsequent photoalignment and solidification. Optionally, a temperature for the pre-baking may be in a range between 90 Degrees Celsius and 130 Degrees Celsius, and a duration for the pre-baking may be in a range between 60s and 120s. In an embodiment, the temperature for the pre-baking is approximately 130 Degrees Celsius and the duration for the pre-bake is approximately 120 seconds.

In step S14, the photoalignment matrix material is solidified to adhere the carbon nanotube layer to the surface of the substrate.

The process of solidifying the photoalignment matrix material includes: irradiating the photoalignment matrix material with a polarized ultraviolet light, where the photoalignment matrix material is solidified to have a predetermined photoalignment orientation. An included angle between the photoalignment orientation and the extending direction of the carbon nanotube is in a range from 0 to 90 degrees, inclusively.

The photoalignment matrix material may be oriented under an irradiation of the polarized ultraviolet light. The energy of the polarized ultraviolet light may be in a range between 300 mJ and 1000 mJ, or may be optionally in a range between 500 mJ and 800 mJ. In an embodiment of the present disclosure, a polyimide film is preferably adopted as the photoalignment matrix material. In a case of the above-described irradiation energy, a photoalignment performance of the polyimide film is optimal. The included angle between the polarization direction of the polarized ultraviolet light and the extending direction of the carbon nanotube of the carbon nanotube layer may be preferably 0 degrees by adjusting the polarization direction of the polarized ultraviolet light. That is, the polarization direction of the polarized ultraviolet light is parallel to the extending direction of the carbon nanotube of the carbon nanotube layer. In this case, the photoalignment matrix material is oriented in a direction parallel to the extending direction of the carbon nanotube, and the included angle between the photoalignment orientation and the extending direction of the carbon nanotube equals to 0 degrees.

After being photoaligned by the polarized ultraviolet light, the photoalignment matrix material may be heated at a temperature in a range between 210 Degrees Celsius and 230 Degrees Celsius for a duration in a range between 20 minutes and 50 minutes, to accelerate the solidification. In an embodiment, the temperature for the solidification is approximately 230 Degrees Celsius and the duration for the solidification is approximately 30 min.

The fabrication method according to an embodiment of the present disclosure has advantages such as a simple process, a high production efficiency and facilitating a mass production. The above-described composite substrate may be prepared by using the fabrication method.

With the above descriptions of the disclosed embodiments, those skilled in the art may practice or use the present disclosure. Various modifications to the embodiments are apparent for those skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

What is claimed is:

1. A composite substrate, comprising:
a substrate, a carbon nanotube layer, and a photoalignment matrix material layer, wherein the carbon nanotube layer is adhered to a surface of the substrate by the photoalignment matrix material layer;
wherein the carbon nanotube layer comprises a plurality of carbon nanotubes extending in one direction;
wherein the carbon nanotube layer is configured to serve as an alignment layer and a polarizer layer;
wherein the carbon nanotube layer is configured to serve as a shielding electrode layer or a common electrode layer, and wherein when the carbon nanotube layer is configured to serve as the common electrode layer, the carbon nanotube layer is further configured to receive a common voltage;
wherein the photoalignment matrix material layer has a photoalignment orientation; and
wherein an included angle between the photoalignment orientation of the photoalignment matrix material layer and an extending direction of the plurality of carbon nanotubes is in a range from 0 to 90 degrees, inclusive.

2. The composite substrate according to claim 1, wherein the included angle between the photoalignment orientation of the photoalignment matrix material layer and the extending direction of the plurality of carbon nanotubes equals 0 degrees.

3. The composite substrate according to claim 1, wherein the photoalignment matrix layer includes one or more materials selected from cellulose triacetate, polyimide, or polyamic acid.

4. The composite substrate according to claim 1, wherein the carbon nanotube layer comprises at least one layer of carbon nanotube film.

5. The composite substrate according to claim 4, wherein the at least one layer of carbon nanotube film is a laser-thinned carbon nanotube film.

6. The composite substrate according to claim 4, wherein the at least one layer of carbon nanotube film has a thickness in a range between 0.5 nm and 100 μm.

7. The composite substrate according to claim 1, wherein the photoalignment matrix material layer permeates into spaces between adjacent carbon nanotubes.

8. The composite substrate according to claim 1, wherein a surface of one of the plurality of carbon nanotubes facing away from the substrate is covered with the photoalignment matrix material layer.

9. The composite substrate according to claim 1, wherein the composite substrate further comprises a plurality of grooves formed on a surface of the photoalignment matrix material layer facing away from the substrate, wherein an extending direction of the plurality of grooves is parallel to the extending direction of the plurality of carbon nanotubes.

10. A liquid crystal display panel, comprising:
a thin film transistor (TFT) array substrate and a color filter substrate, wherein the TFT array substrate and the color filter substrate are arranged opposite to each other;
a liquid crystal layer arranged between the TFT array substrate and the color filter substrate; and
a photoalignment matrix material layer and a carbon nanotube layer,
wherein the carbon nanotube layer is adhered, the photoalignment matrix material layer to a surface of the TFT array substrate, wherein said surface of the TFT array substrate faces the liquid crystal layer; or the carbon nanotube layer is adhered, by the photoaligmnent matrix material layer, to a surface of the color filter substrate, wherein said surface of the color filter substrate fasces the liquid crystal layer;
wherein the carbon nanotube layer is configured to serve as an alignment layer and a polarizer layer;
wherein the carbon nanotube layer is configured to serve as a shielding electrode layer or a common electrode layer, and wherein when the carbon nanotube layer is configured to serve as the common electrode layer, the carbon nanotube layer is further configured to receive a common voltage;
wherein the photoalignment matrix material layer has a photoalignment orientation; and
wherein an included angle between the photoalignment orientation of the photoalignment matrix material layer and an extending direction of the plurality of carbon nanotubes is in a range from 0 to 90 degrees, inclusive.

11. The liquid crystal display panel according to claim 10, wherein the carbon nanotube layer is adhered to the surface of the TFT array substrate facing the liquid crystal layer by the photoalignment matrix material layer, and the carbon nanotube layer is connected to a common voltage.

12. The liquid crystal display panel according to claim 10, wherein the carbon nanotube layer is adhered to the surface of the color filter substrate facing the liquid crystal layer with the photoalignment matrix material, and the carbon nanotube layer is grounded.

13. The liquid crystal display panel according to claim 10, wherein
wherein the carbon nanotube layer further comprises a first carbon nanotube layer comprising a plurality of first carbon nanotubes and a second carbon nanotube layer comprising a plurality of second carbon nanotubes;
wherein the photoalignment matrix material layer comprises a first photoalignment matrix material layer and a second photoalignment matrix material layer;
wherein the first carbon nanotube layer is adhered to the surface of the TFT array substrate facing the liquid crystal layer by the first photoalignment matrix material layer, and wherein the first carbon nanotube layer is connected to a common voltage; and
wherein the second carbon nanotube layer is adhered to the surface of the color filter substrate facing the liquid crystal layer by the second photoalignment matrix material layer, and wherein the second carbon nanotube layer is grounded,
wherein the extending direction of the plurality of first carbon nanotubes in the first carbon nanotube layer is perpendicular to the extending direction of the plurality of second carbon nanotubes in the second carbon nanotube layer.

14. A method for fabricating a composite substrate, wherein the composite substrate comprises a substrate, a carbon nanotube layer and a photoalignment matrix material layer, wherein the carbon nanotube layer is adhered to a surface of the substrate with the photoalignment matrix material layer, and wherein the carbon nanotube layer comprises a plurality of carbon nanotubes extending in one direction;

the method comprising:

preparing the substrate;

coating the substrate with the photoalignment matrix material layer;

laying the carbon nanotube layer on a surface of the photoalignment matrix material layer; and solidifying the photoalignment matrix material layer to adhere the carbon nanotube layer to a surface of the substrate, wherein the process of solidifying the photoalignment matrix material comprises: irradiating the photoalignment matrix material layer with a polarized ultraviolet light such that the photoalignment matrix material layer is solidified to have a predetermined photoalignment orientation, wherein an included angle between the predetermined photoalignment orientation and an extending direction of the carbon nanotube is in a range from 0 degree to 90 degrees, inclusive;

wherein the carbon nanotube layer comprises a plurality of carbon nanotubes extending in one direction; and wherein the carbon nanotube layer is configured to serve as an alignment layer and a polarizer layer;

wherein the carbon nanotube layer is configured to serve as a shielding electrode layer or a common electrode layer, and wherein when the carbon nanotube layer is configured to serve as the common electrode layer, the carbon nanotube layer is further configured to receive a common voltage.

* * * * *